(12) United States Patent
Cziomer et al.

(10) Patent No.: US 10,308,145 B2
(45) Date of Patent: Jun. 4, 2019

(54) TRACK ASSEMBLY

(71) Applicant: Lear Corporation, Southfield, MI (US)

(72) Inventors: Alfred Cziomer, Rietberg (DE); Marc Laumeier, Langenberg-Benteler (DE); Klaus Walter, Panderborn (DE); Michael Wojatzki, Ennigerloh (DE); Torsten Bochert, Rietberg (DE); Andre Schebaum, Steinhagen (DE)

(73) Assignee: Lear Corporation, Southfield, MI (US)

( * ) Notice: Subject to any disclaimer, the term of this patent is extended or adjusted under 35 U.S.C. 154(b) by 26 days.

(21) Appl. No.: 15/378,603

(22) Filed: Dec. 14, 2016

(65) Prior Publication Data

US 2017/0166093 A1 Jun. 15, 2017

Related U.S. Application Data

(60) Provisional application No. 62/267,554, filed on Dec. 15, 2015.

(30) Foreign Application Priority Data

Dec. 12, 2016 (DE) .......................... 10 2016 224 663

(51) Int. Cl.
*B60N 2/08* (2006.01)
*B60N 2/015* (2006.01)
(Continued)

(52) U.S. Cl.
CPC ....... *B60N 2/0806* (2013.01); *B60N 2/01541* (2013.01); *B60N 2/085* (2013.01);
(Continued)

(58) Field of Classification Search
CPC .... B60N 2/0806; B60N 2/929; B60N 2/0887; B60N 2/0881; B60N 2/01541; B60N 2/06; B60N 2/07; B60N 2/08; B60N 2205/40; B60N 2/0825; B60N 2/0875; B60N 2/085; B60N 2/20; B60N 2/206; B60N 2002/957; B60N 2002/2204; Y10T 292/03; Y10T 292/0947; Y10T 292/1016
(Continued)

(56) References Cited

U.S. PATENT DOCUMENTS 4,478,383 A * 10/1984 Urai ..................... B60N 2/0705
248/429
4,530,481 A 7/1985 Kluting
(Continued)

FOREIGN PATENT DOCUMENTS

DE 60308424 T2 9/2007

*Primary Examiner* — Ingrid M Weinhold
(74) *Attorney, Agent, or Firm* — Fishman Stewart PLLC

(57) ABSTRACT

A track assembly including a track and a support. The support may be configured for selective connection with the track. The support may include a lock plate that may be configured to selectively limit movement of the support relative to the track in at least one of a first direction and a second direction. The support may include an anchor that may be configured to selectively limit movement of the support relative to the track in at least one of the second direction and a third direction. The support may include a cam that may be configured to selectively engage and disengage at least one of the lock plate and the anchor from the track.

17 Claims, 15 Drawing Sheets

(51) Int. Cl.
  *B60N 2/90* (2018.01)
  *B60N 2/20* (2006.01)
  *B60N 2/22* (2006.01)

(52) U.S. Cl.
  CPC ......... *B60N 2/0825* (2013.01); *B60N 2/0875* (2013.01); *B60N 2/0881* (2013.01); *B60N 2/20* (2013.01); *B60N 2/206* (2013.01); *B60N 2/929* (2018.02); *B60N 2002/2204* (2013.01); *B60N 2002/957* (2018.02)

(58) Field of Classification Search
  USPC ......... 248/429, 503.1; 297/344.1; 296/65.03, 296/65.13, 65.15
  See application file for complete search history.

(56) References Cited

U.S. PATENT DOCUMENTS

| | | | |
|---|---|---|---|
| 4,613,186 A | 9/1986 | LaPointe | |
| 5,106,144 A | 4/1992 | Hayakawa | |
| 5,158,338 A | 10/1992 | Hayakawa | |
| 5,348,261 A | 9/1994 | Nini | |
| 5,368,355 A | 11/1994 | Hayden | |
| 6,357,814 B1* | 3/2002 | Boisset | B60N 2/01541 248/429 |
| 6,648,394 B2* | 11/2003 | Lejeune | B60N 2/01541 248/429 |
| 6,736,458 B2* | 5/2004 | Chabanne | B60N 2/01541 248/429 |
| 6,902,235 B2* | 6/2005 | Rohee | B60N 2/08 248/424 |
| 7,819,475 B2* | 10/2010 | Shao | B60N 2/01541 297/344.11 |
| 9,010,713 B2* | 4/2015 | Kim | B60N 2/01541 248/429 |
| 2003/0047977 A1* | 3/2003 | Lejeune | B60N 2/01541 297/344.1 |
| 2006/0220411 A1* | 10/2006 | Pathak | B60N 2/01541 296/65.11 |
| 2013/0112833 A1* | 5/2013 | Kim | B60N 2/0705 248/429 |
| 2014/0110554 A1 | 4/2014 | Oya | |
| 2015/0129737 A1 | 5/2015 | Oya | |
| 2016/0114703 A1 | 4/2016 | Fujita | |

* cited by examiner

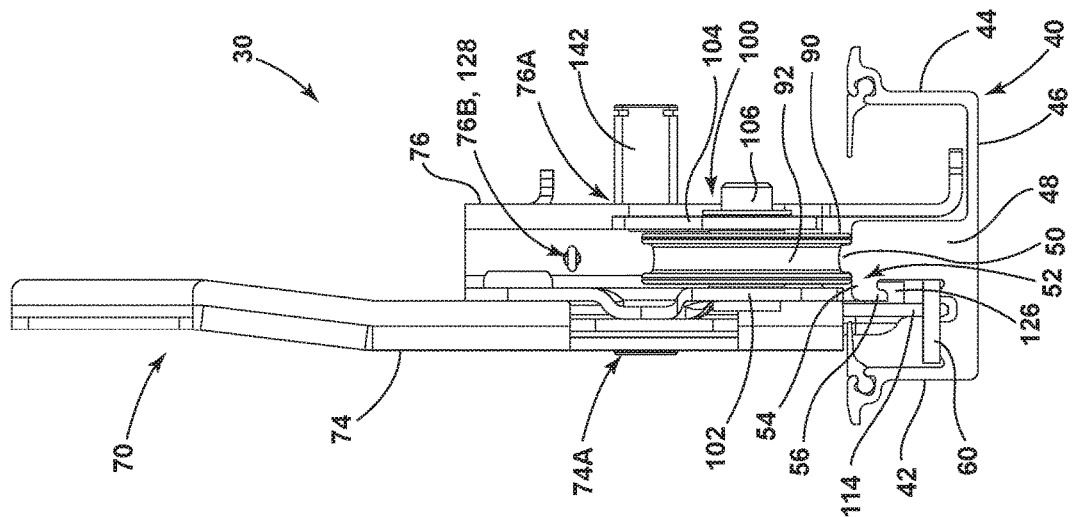
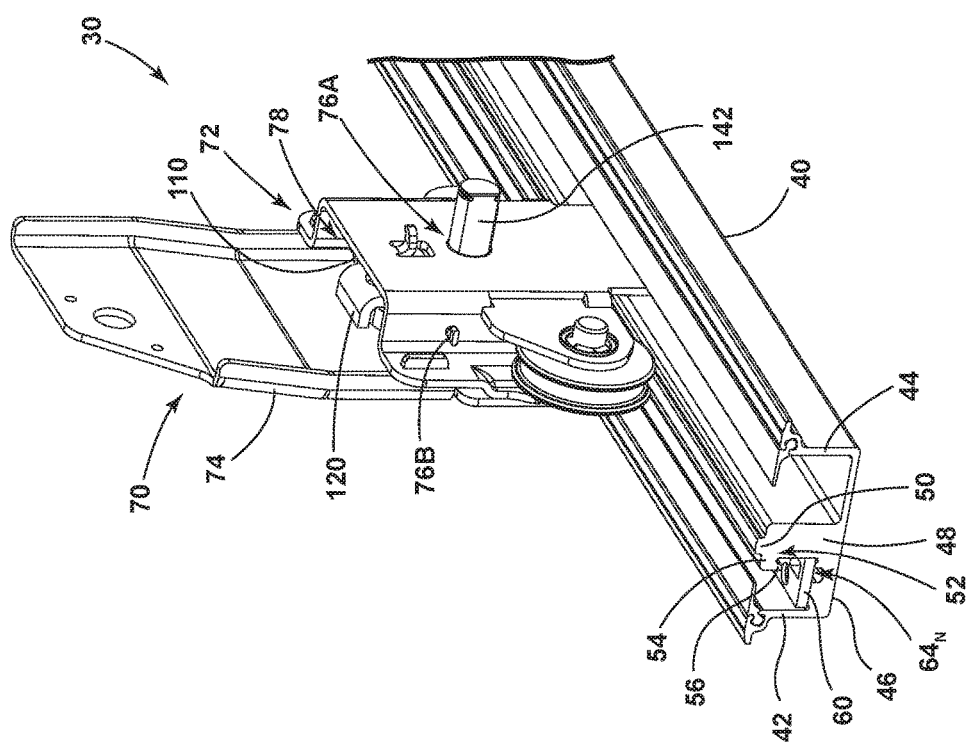

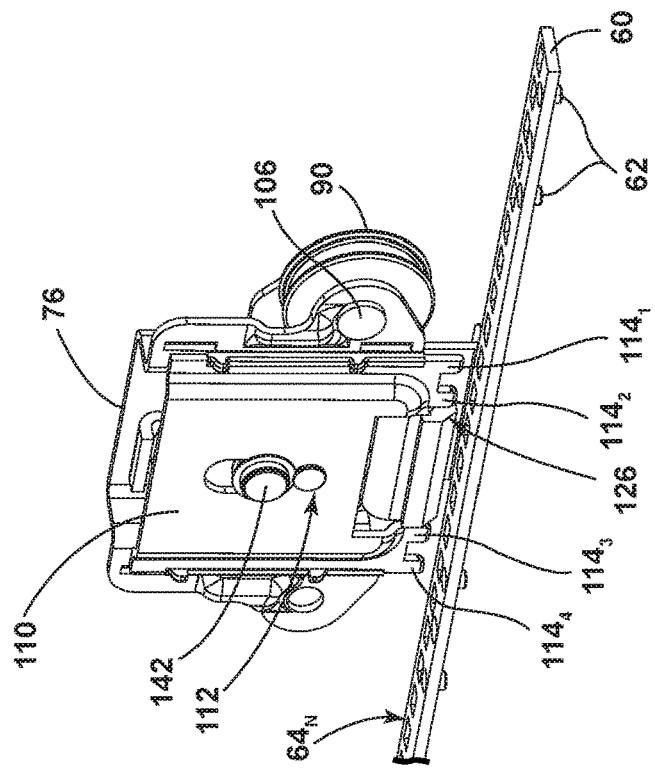
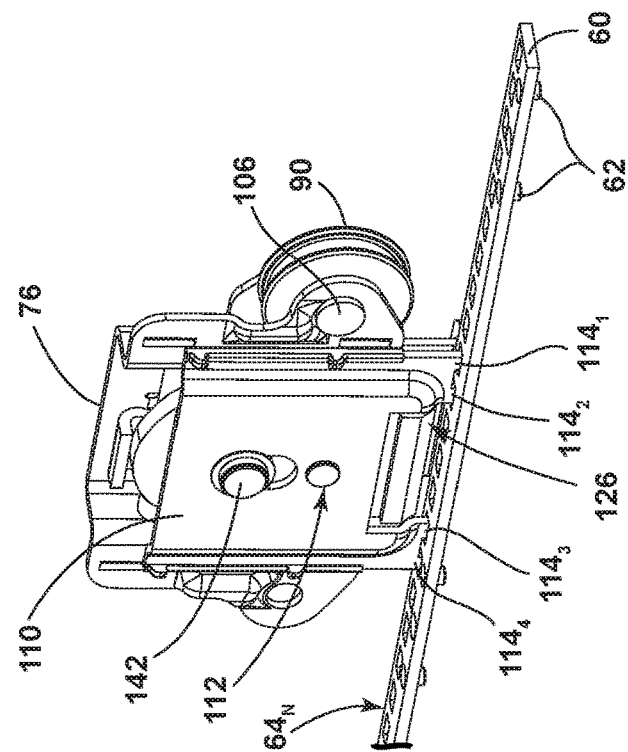

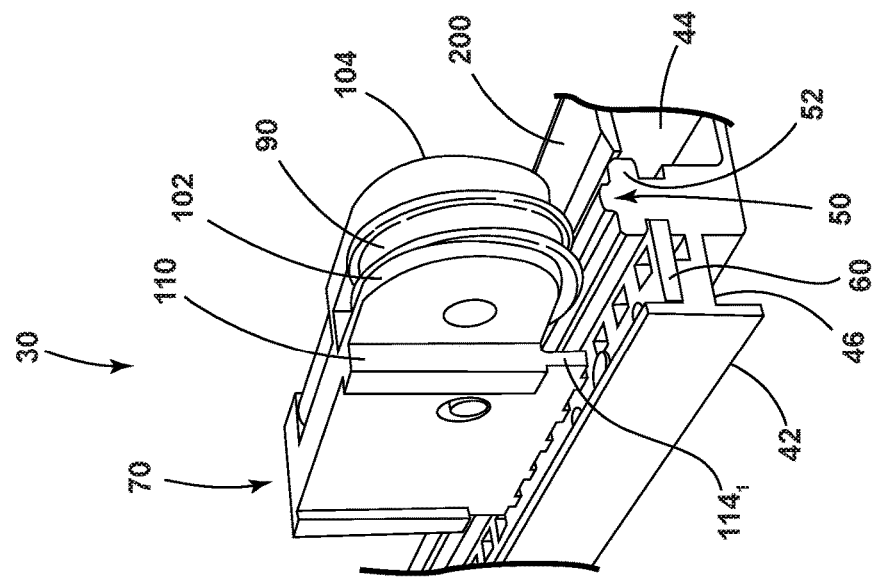
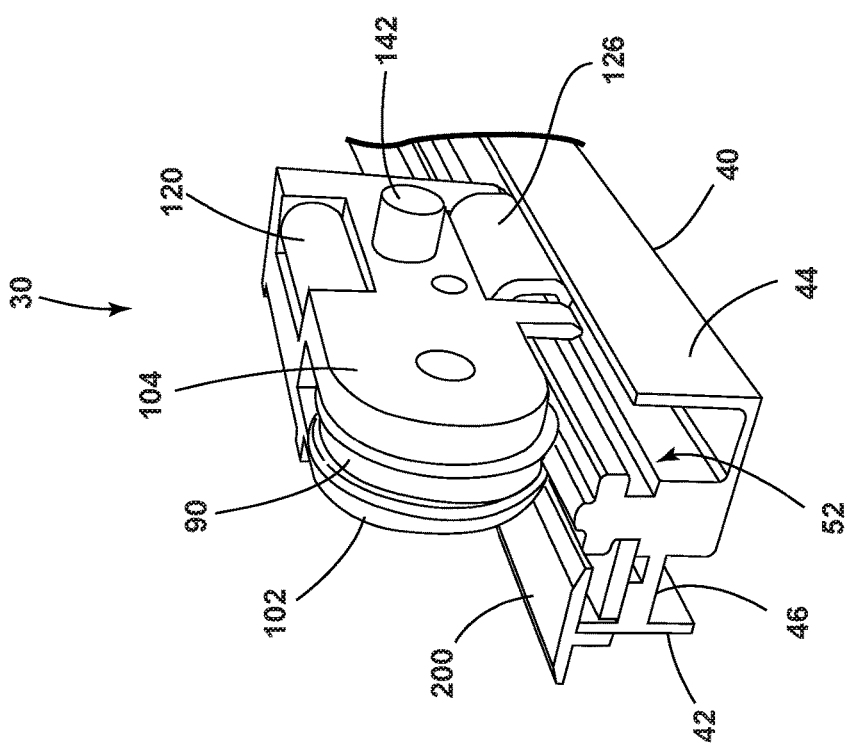
FIG. 12A
FIG. 12B

TRACK ASSEMBLY

CROSS-REFERENCE TO RELATED APPLICATIONS

This application claims the benefit of U.S. Provisional Application Ser. No. 62/267,554 filed Dec. 15, 2015 and German Patent Application No. 102016224663.1 filed Dec. 12, 2016, the disclosures of which are hereby incorporated herein by reference in their entirety.

TECHNICAL FIELD

The present disclosure relates to track assemblies, such as seat track assemblies configured for use with one or more seats that may be assembled with and/or disassembled from the seat track assemblies.

BACKGROUND

Passenger vehicles, such as automobiles for example, may include one or more seat assemblies that may be configured to support occupants within the vehicle. It may be desirable to move seats within a vehicle between a plurality of longitudinal positions, transverse positions, and/or to selectively secure seats with seat tracks and selectively remove seats from a vehicle.

SUMMARY

In embodiments, a track assembly may comprise a track and a support. The support may be configured for selective connection with the track. The support may include a lock plate that may be configured to selectively limit movement of the support relative to the track in at least one of a first direction and a second direction. The support may include an anchor that may be configured to selectively limit movement of the support relative to the track in at least one of the second direction and a third direction. The support may include a cam that may be configured to selectively engage and disengage at least one of the lock plate and the anchor from the track.

BRIEF DESCRIPTION OF THE DRAWINGS

FIG. 4A is a perspective view generally illustrating portions of a track assembly in accordance with embodiments of the present disclosure.

FIG. 4B is a side view generally illustrating portions of a track assembly in accordance with embodiments of the present disclosure.

FIGS. 6A and 6B are perspective views generally illustrating portions of track assemblies in accordance with embodiments of the present disclosure.

FIGS. 12A, 12B, 13A, and 13B are perspective views generally illustrating portions of track assemblies in accordance with embodiments of the present disclosure.

DETAILED DESCRIPTION

Reference will now be made in detail to embodiments of the present disclosure, examples of which are described herein and illustrated in the accompanying drawings. While the present disclosure will be described in conjunction with embodiments, it should be understood that the present disclosure is not limited to these embodiments.

Figure 1:
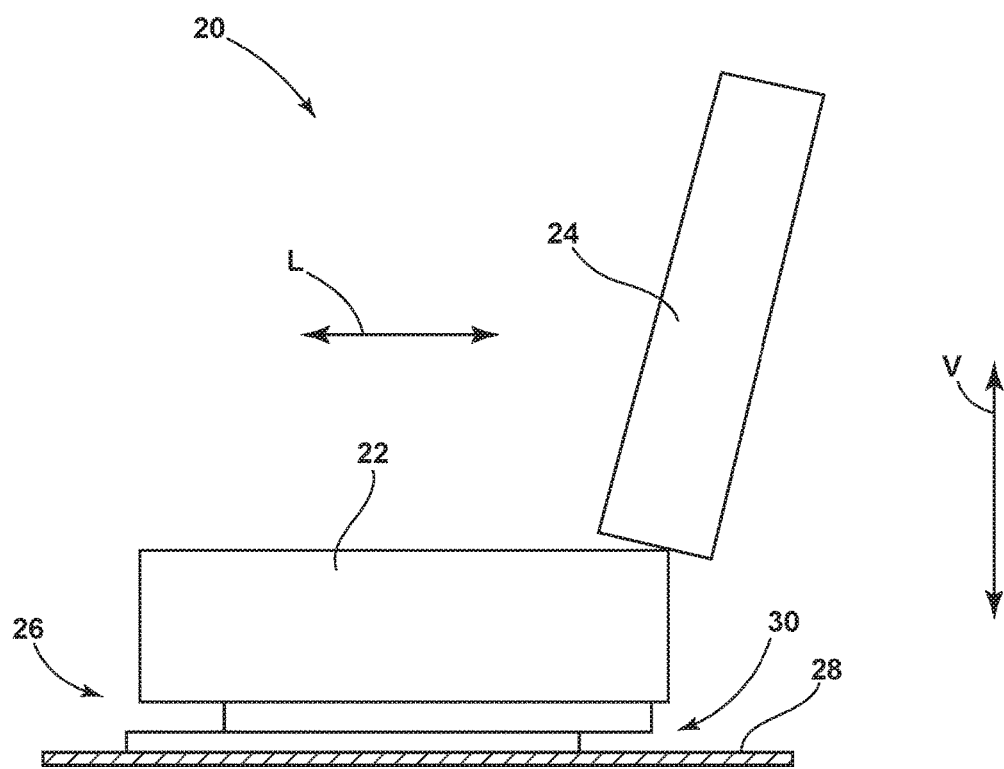
FIG. 1 is a side view generally illustrating portions of a vehicle seat and a track assembly in accordance with embodiments of the present disclosure.
Figure 2:
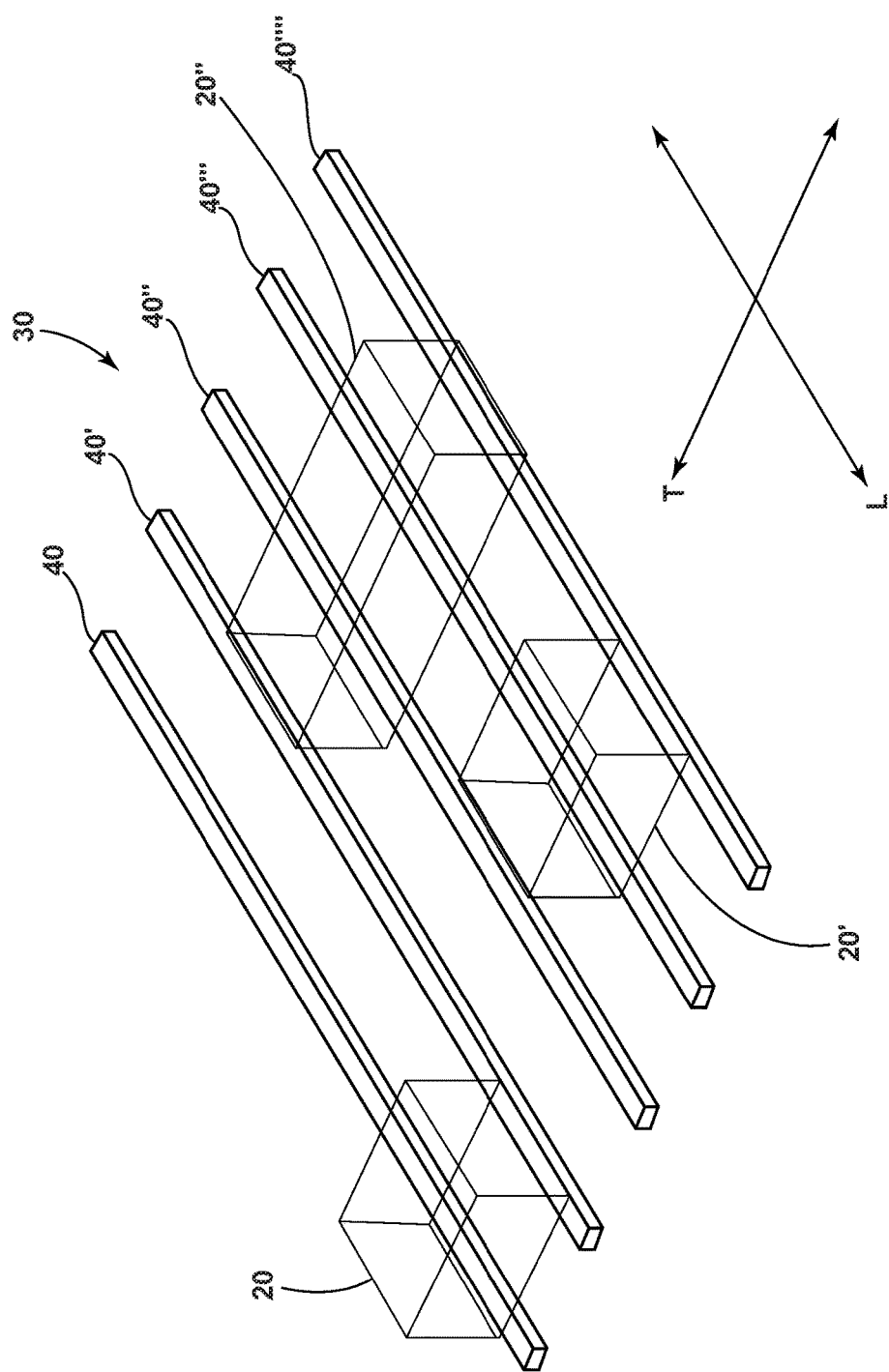
FIG. 2 is a block diagram generally illustrating portions of various vehicle seats and track assemblies in accordance with embodiments of the present disclosure.

Referring now to FIG. 1, in embodiments, a seat 20 may include a seat cushion 22, a seat back 24, and/or a seat frame 26. In embodiments, seat cushion 22 and/or seat back 24 may be supported by seat frame 26. In embodiments, seat 20 may be connected and/or fixed to a surface 28 (e.g., a floor of a vehicle), which may include seat frame being configured for connection with a track assembly 30. In embodiments, track assembly may be configured to permit seat 20 to move (e.g., in a longitudinal direction), and/or may be configured to selectively connect seat 20 to surface 28. In embodiments, such as generally illustrated in FIG. 2, a plurality of seats (e.g., seats 20, 20', 20") may be connected to surface 28 via track assembly 30, which may include one or more tracks (e.g., tracks 40, 40', 40", 40''', 40'''').

In embodiments, such as generally illustrated in FIGS. 3, 4A, 4B, 4C, 4D, and 4E, track assembly 30 may include a track 40 and/or a support 70. In embodiments, support 70 may, for example, be configured to support seat 20, and/or support 70 may be referred to herein as seat support 70, but is not limited to seating applications. In embodiments, track 40 may include one or more of a variety of shapes, sizes, configurations, and/or materials. For example, and without limitation, track 40 may include a generally W-shaped configuration that may include a first side wall 42, a second side wall 44, a bottom wall 46, and/or a middle wall 48, some or all of which may include aluminum. In embodiments, middle wall 48 may be disposed between first side wall 42 and second side wall 44, and/or may include a longitudinally-extending ridge 50 that may project vertically upward from middle wall 48. In embodiments, middle wall 48 may include a ledge 52 that may include a horizontal portion 54 that may extend laterally outward from middle wall 48 (e.g., toward first side wall 42) and/or a vertical portion 56 that may extend vertically downward from horizontal portion 54 (e.g., toward bottom wall 46), such that ledge 52 may include a generally hook-shaped configuration. In embodiments, track 40 may include a lock profile 60 that may be connected and/or fixed to bottom wall 46 of track 40, such as via one or more rivets 62. In embodiments, lock profile 60 may include an elongated plate (e.g., a steel plate) that may be disposed between first side wall 42 and/or middle wall 48. In embodiments, lock profile 60 may include a plurality of apertures $64_N$ that may be disposed along the length of lock profile 60.

In embodiments, seat support 70 may include a housing 72 that may include a first portion 74 and/or a second portion 76 that may define an internal space 78. In embodiments, housing 72 may be configured to support a wheel 90. For example, and without limitation, housing 72 may include a yoke 100 that may include a first support element 102 that may extend from first portion 74 and/or a second support element 104 that may extend from second portion 76. Yoke 100 may be configured to rotatably support wheel 90, such as via an axle 106 about which and/or with which wheel 90 may rotate. In embodiments, wheel 90 may be configured to roll along or about middle wall 48 of track 40. For example, and without limitation, wheel 90 may include a circumferential groove 92 that may be configured to at least partially receive ridge 50.

Figure 5B:
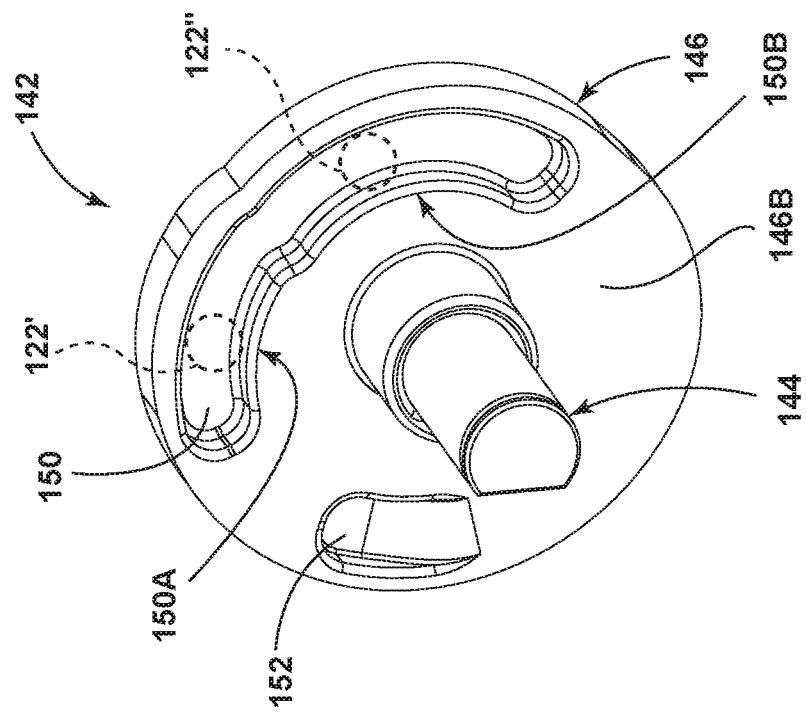
FIGS. 5A and 5B are perspective views generally illustrating portions of cams in accordance with embodiments of the present disclosure.
Figure 5A:
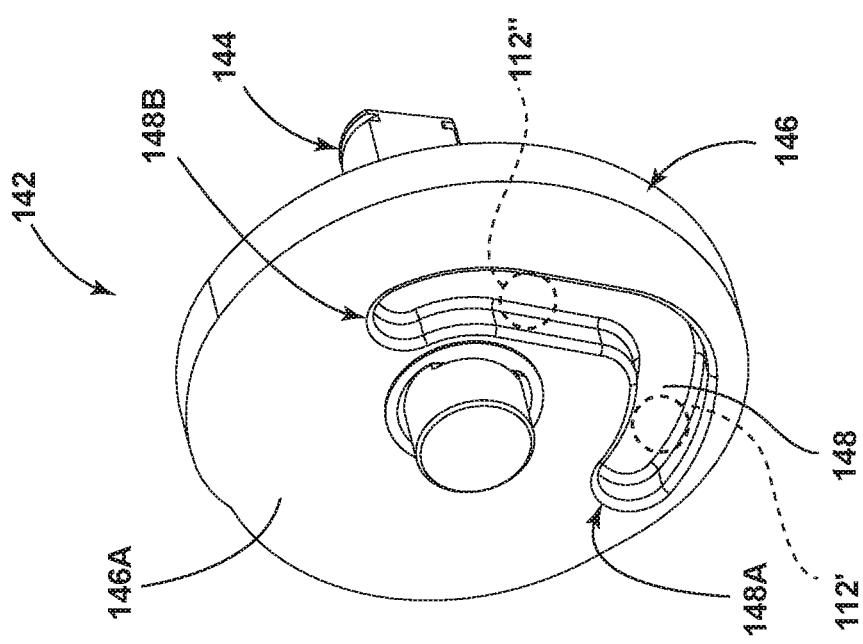

In embodiments, housing 72 may include a lock plate 110, an anchor 120, and/or a actuation assembly 140. In embodiments, actuation assembly 140 may include a cam 142 that may be configured to actuate lock plate 110 and/or anchor 120. In embodiments, such as generally illustrated in FIGS. 5A and 5B, cam 142 may include a generally annular configuration, and may include a first section 144 and/or a second section 146. In embodiments, second section 146 may include a larger diameter than first section 144. In embodiments, such as generally illustrated in FIG. 5A, second section 146 may include a lock plate recess 148 that may be configured to at least partially receive a pin 112 of lock plate 110 and may include a first section 148A and/or a second section 148B. First section 148A may include a first radius (e.g., minimum distance from the center of cam 142) and second section 148B may include a second radius. The first radius may be larger than the second radius (e.g., first section 148A may be disposed farther from the center of cam 142 than second section).

In embodiments, such as generally illustrated in FIG. 5B, second section 146 may include a first anchor recess 150 that may be configured to at least partially receive a first pin 122 of anchor 120, and/or second section 146 may include a second recess 152 that may be configured to at least partially receive a second pin 124 of anchor 120. In embodiments, lock plate recess 148 may be disposed at and/or in a first axial surface 146A of second section 146. In embodiments, first anchor recess 150 and/or second anchor recess 152 may be disposed at and/or in a second axial surface 146B of second section 146. First axial surface 146A and second axial surface 146B may be disposed opposite each other. In embodiments, housing 72 may be configured to rotatably support cam 142. For example, and without limitation, housing first portion 74 may include an aperture 74A that may be configured to receive at least a portion of cam 142, and/or housing second portion 76 may include an aperture 76A that may be configured to receive at least a portion of cam 142. In embodiments, first anchor recess 150 may include a first section 150A and/or a second section 150B. The first section may include a first radius (e.g., a minimum distance from the center of cam 142) and/or the second section may include a second radius. The second radius may be smaller than the first radius (e.g., first section 150A may be disposed farther from the center of cam 142 than second section 150B). Anchor 120 may be configured to move, at least in part according to the configuration of recess 150. For example, and without limitation, anchor 120 may be configured to move downward as cam 142 rotates (e.g., from a locking position to an unlocking position) and pin 122 of anchor 120 moves from a first position 122' in first section 150A to a second position 122' in second section 150B (e.g., as cam 142 rotates, pin 122 may slide in recess 150 and pin 122 may move closer to the center of cam 142 when it moves from first section 150A to second section 150B, which may allow and/or cause anchor 120 to move downward and/or to disengage from ledge 52).

In embodiments, such as generally illustrated in FIGS. 6A and 6B, lock plate 110 may be configured to selectively limit movement of support 70 and/or housing 72 relative to track 40 in at least one direction. For example, and without limitation, lock plate 110 may be configured to selectively limit movement of housing 72 in the longitudinal direction L and/or the transverse direction T. In embodiments, lock plate 110 may include one or more of a variety of shapes, sizes, configurations, and/or materials. For example, and without limitation, lock plate may include a generally planar configuration and may include one or more teeth $114_N$ (e.g., teeth $114_1$, $114_2$, $114_3$, $114_4$) that may extend vertically downward. In embodiments, teeth $114_N$ may be configured to selectively engage apertures $64_N$ of lock profile according to the position (e.g., vertical position) of lock plate. In embodiments, in a first/locked position of lock plate (e.g., as generally illustrated in FIGS. 4B, 4C, 4D, and 6A), teeth $114_N$ may be at least partially disposed in corresponding apertures $64_N$ of lock profile 60, which may limit movement of housing 72 in the longitudinal direction L and/or the transverse direction T. In embodiments, in a second/unlocked position of lock plate 110 (e.g., as generally illustrated in FIG. 6B), teeth $114_N$ may be disposed at a distance from (e.g., not engaged with) apertures $64_N$ and/or lock profile 60, which may not substantially limit movement of housing 72. In embodiments, lock plate 110 may include pin 112 that may be connected and/or fixed to lock plate 110. In embodiments, cam 142 may be moved (e.g., rotated) between a locking position and an unlocking position. In the locking position of cam 142, pin 112 may be disposed at least partially in lock plate recess 148 at or about first section 148A (e.g., in a first position 112') and lock plate 110 may be disposed in a locked/engaged position. As cam 142 moves toward its unlocking position, pin 112 may slide along lock plate recess 148 until pin 112 reaches second section 148B (e.g., a second position 112"). If pin 112 reaches second section 148B, cam 142 may cause pin 112 to move vertically upward, which may cause lock plate 110 to move (e.g., vertically) such that teeth $114_N$ may be removed from engagement with apertures $64_N$, which may allow housing 72 to move relative to track 40 (e.g., sliding, and/or rolling) in the longitudinal direction L.

In embodiments, such as generally illustrated in FIGS. 4B, 6A, 6B, and 7, anchor 120 may be configured to selectively limit movement of housing 72 relative to track 40 in at least one direction. For example, and without limitation, anchor 120 may be configured to selectively limit movement of housing 72 in the vertical direction V and/or the transverse direction T. In embodiments, anchor 120 may include one or more of a variety of shapes, sizes, configurations, and/or materials. For example, and without limitation, anchor may include a generally planar configuration and may include an anchoring section 126 that may be configured to engage ledge 52 of middle wall 48. In embodiments, housing second portion 76 may be configured to rotatably support anchor 120 such that anchor 120 may be configured to rotate about an axis 128 that may be substantially parallel with the longitudinal direction L. For example, and without limitation, housing second portion 76 may include a rod 76B that may extend through at least a portion of anchor 120 and/or anchor 120 may rotate about rod 76B. In embodiments, first pin 122 of anchor 120 may be disposed at or near a top of anchor 120 and may be configured to slide within first anchor recess 150 of cam 142 as cam 142 rotates. In embodiments, second pin 124 of anchor 120 may be disposed at or near a middle of anchor 120 and/or may be configured to slide into second anchor recess 152 if cam 142 is moved (e.g., rotated) a sufficient amount.

Figure 7:
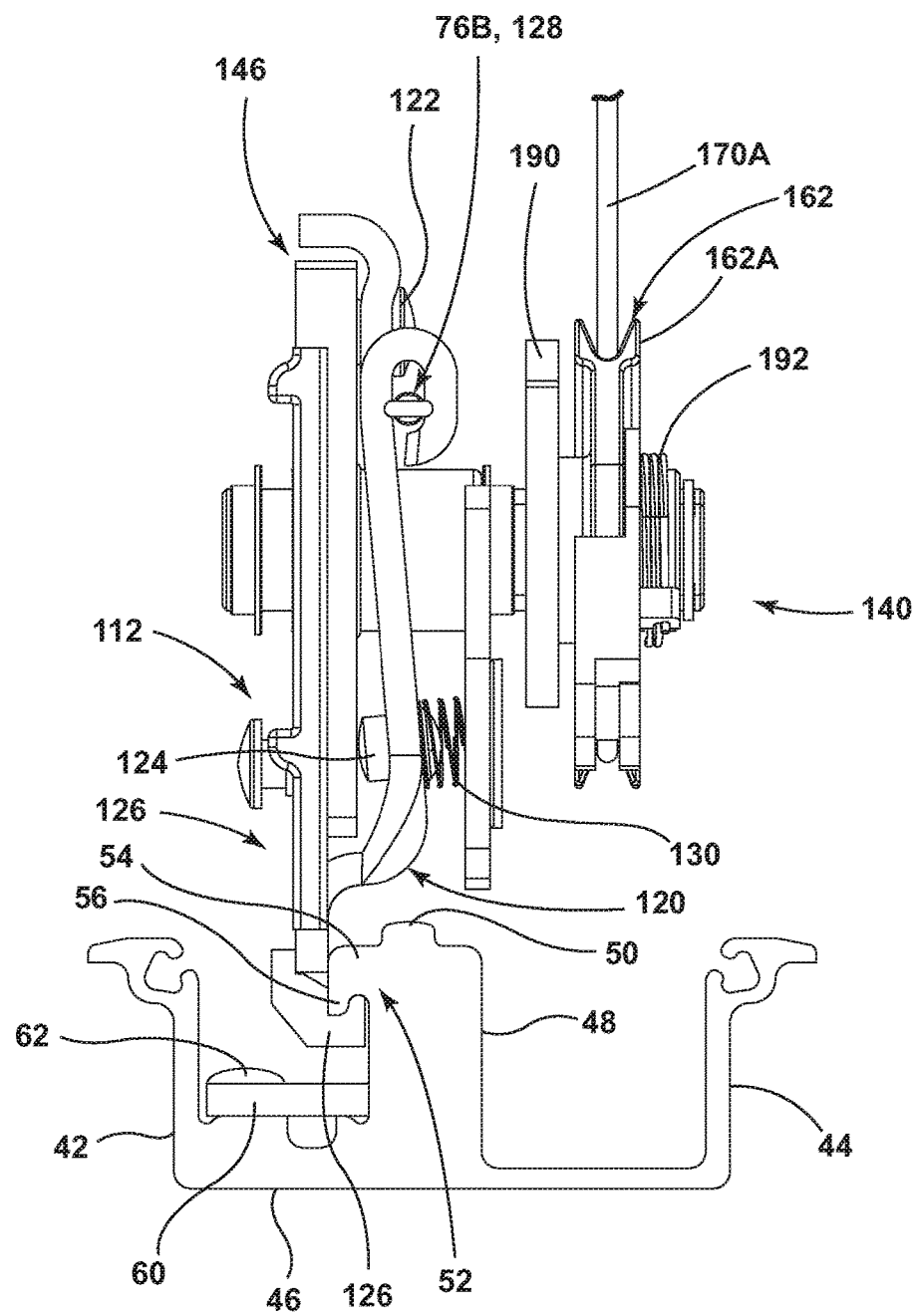
FIGS. 7, 8A, and 8B are side views generally illustrating portions of track assemblies in accordance with embodiments of the present disclosure.

In embodiments, in a first range of cam positions, second pin 124 may not be aligned with second anchor recess 152 and may limit rotational movement of anchor 120 (e.g., clockwise rotation in FIG. 7). In the first range of cam positions, anchoring section 126 may be engaged with and/or clamped on ledge 52 of track middle wall 48 (see, e.g., FIG. 4B). In embodiments, lock plate 110 may restrict movement (e.g., rotation) of anchor 120, such as while lock plate 110 is in a locked position. In embodiments, lock plate 110 may not restrict movement (e.g., rotation) of anchor 120, such as while lock plate 110 is in an unlocked locked position. For example, and without limitation, in an unlocked position of lock plate 110, anchor 120 may be permitted to rotate into recess 116 of lock plate.

Figure 8A:
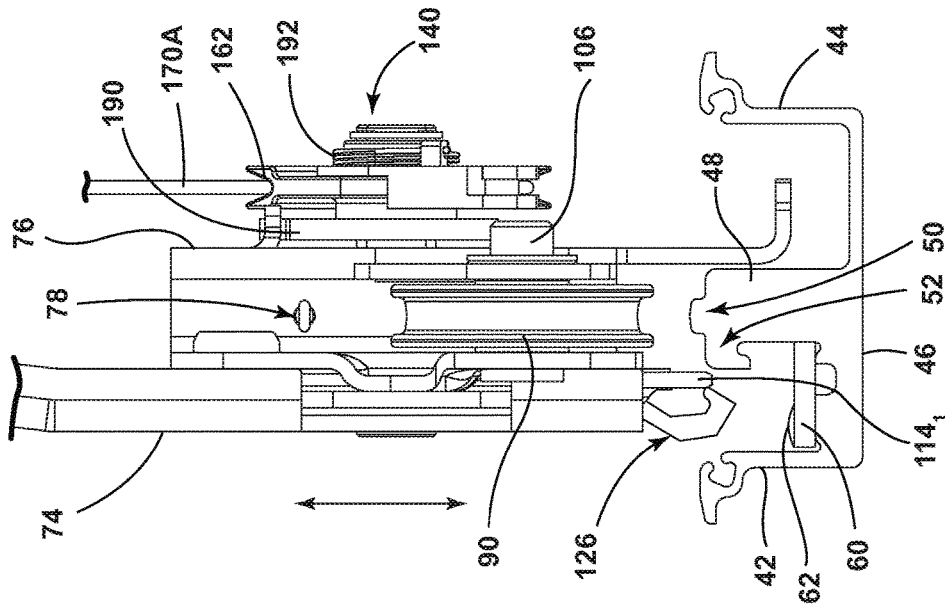
Figure 8B:
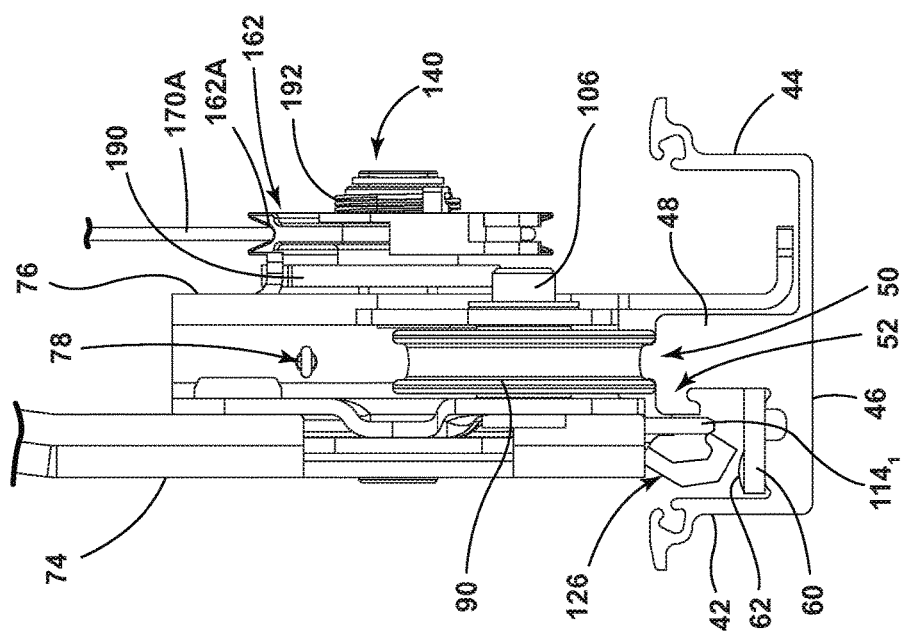
Figure 9:
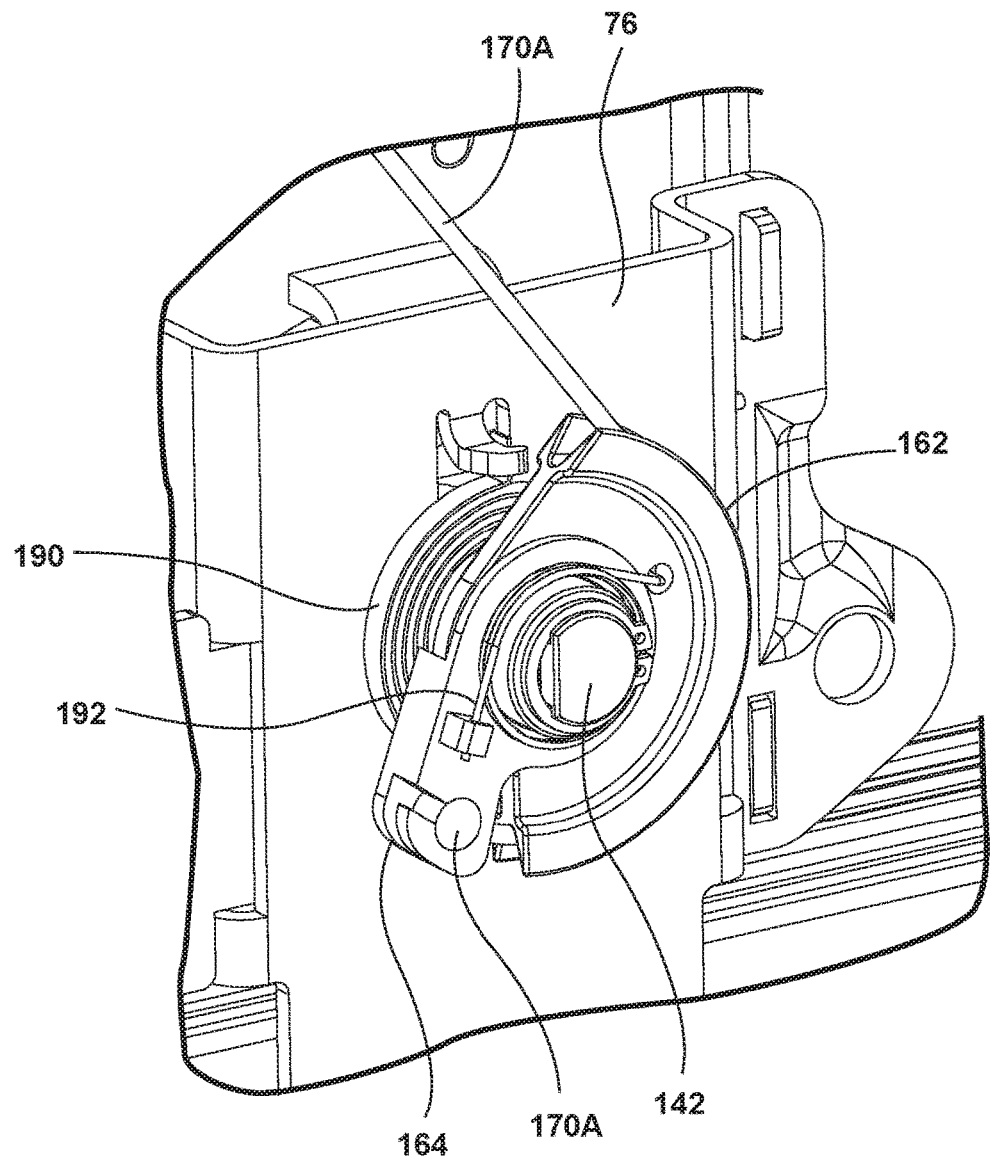
FIG. 9 is a perspective view generally illustrating portions of an actuation assembly of a track assembly in accordance with embodiments of the present disclosure.
Figure 10:
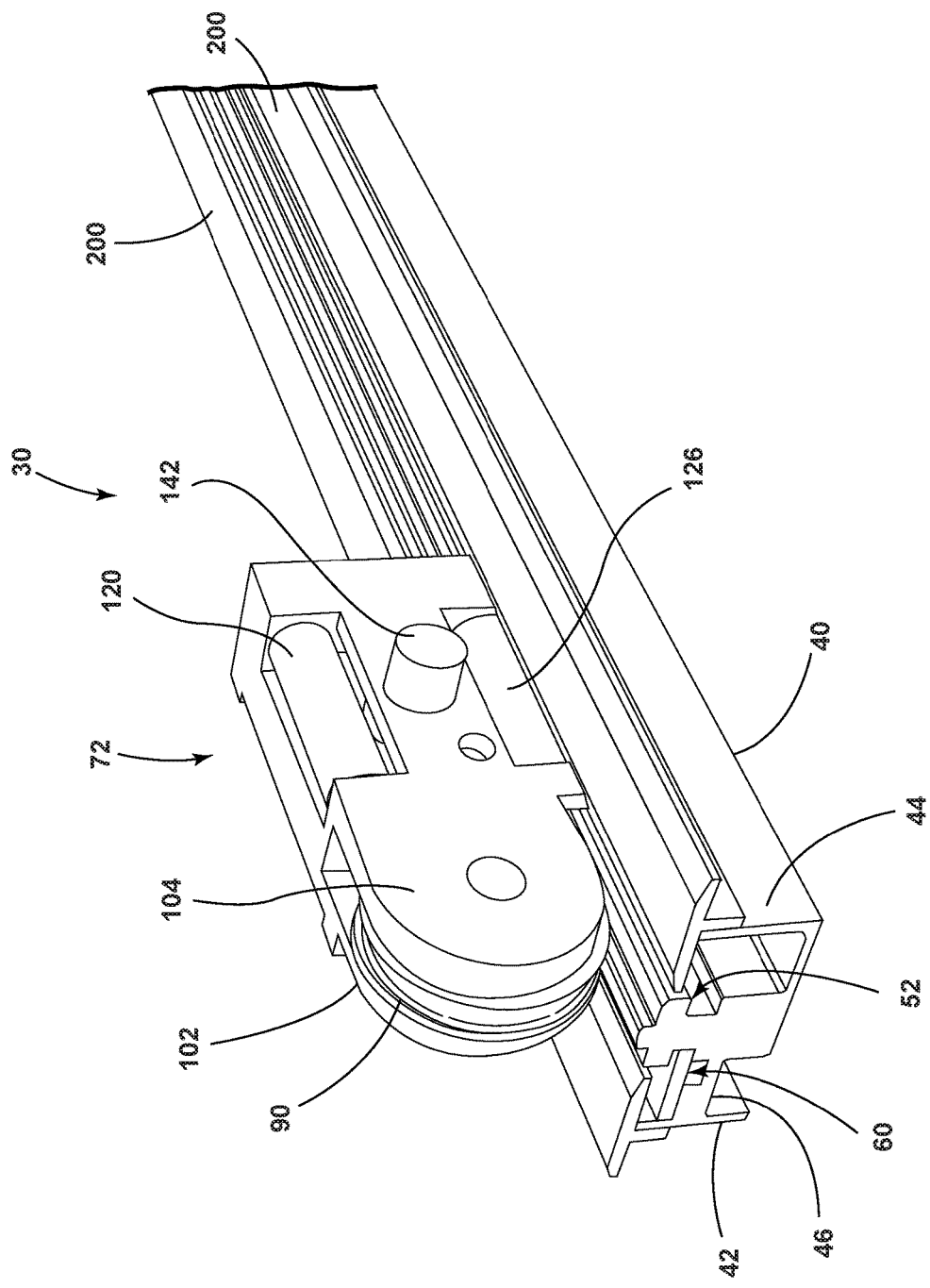
FIG. 10 is a perspective view generally illustrating portions of a track assembly in accordance with embodiments of the present disclosure.
Figure 11:
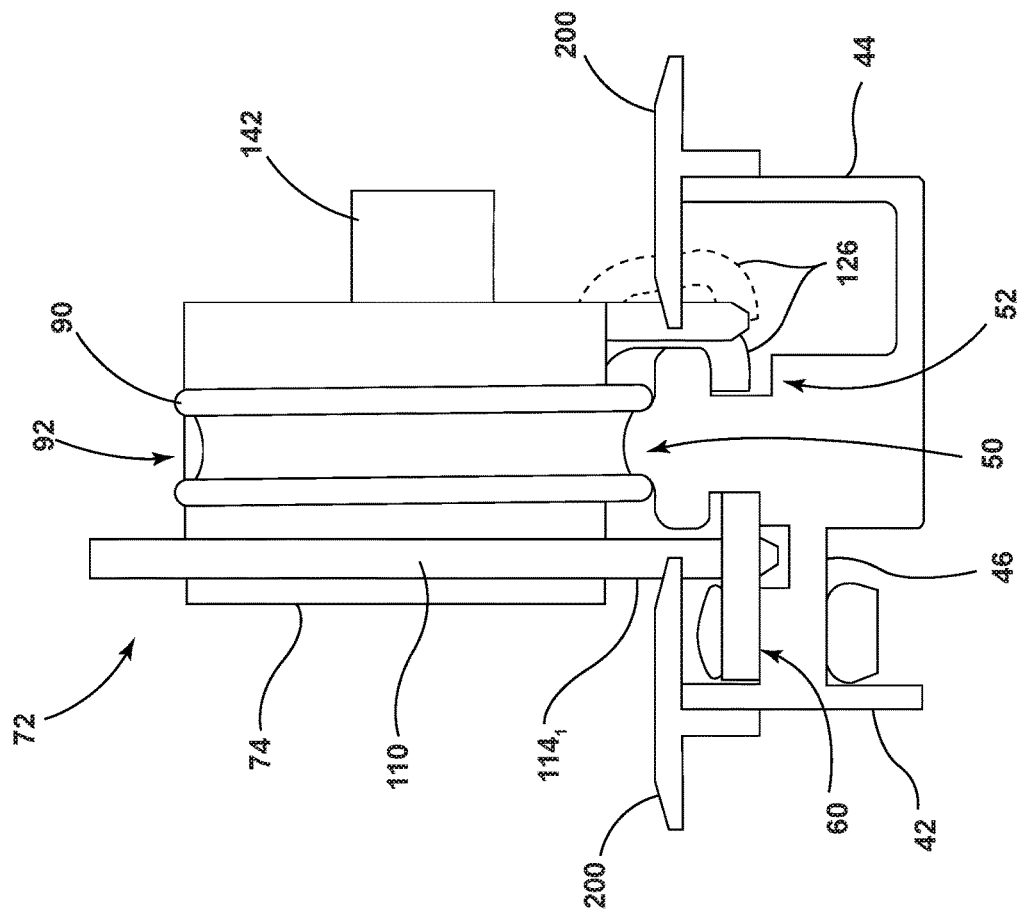
FIG. 11 is a side view generally illustrating portions of a track assembly in accordance with embodiments of the present disclosure.
Figure 13B:
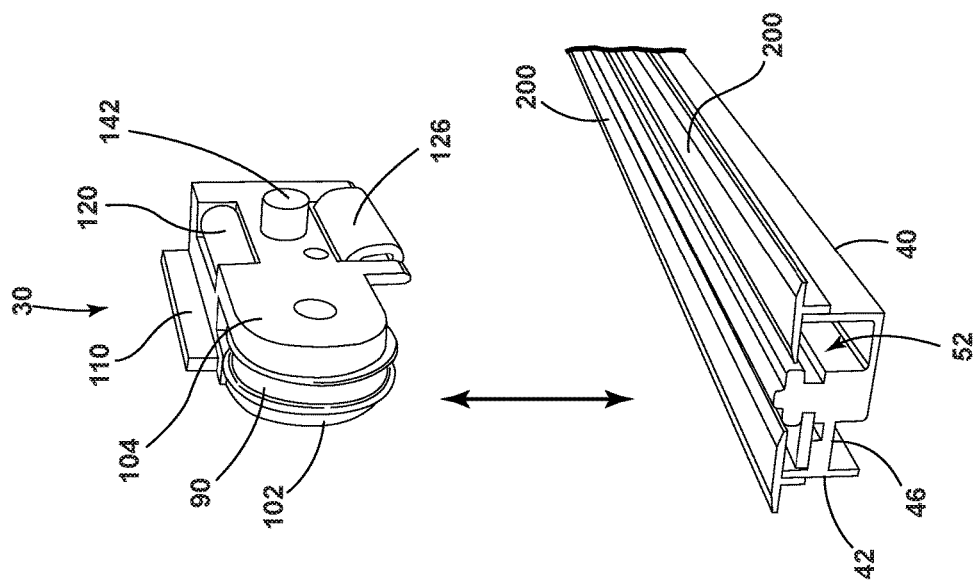
Figure 13A:
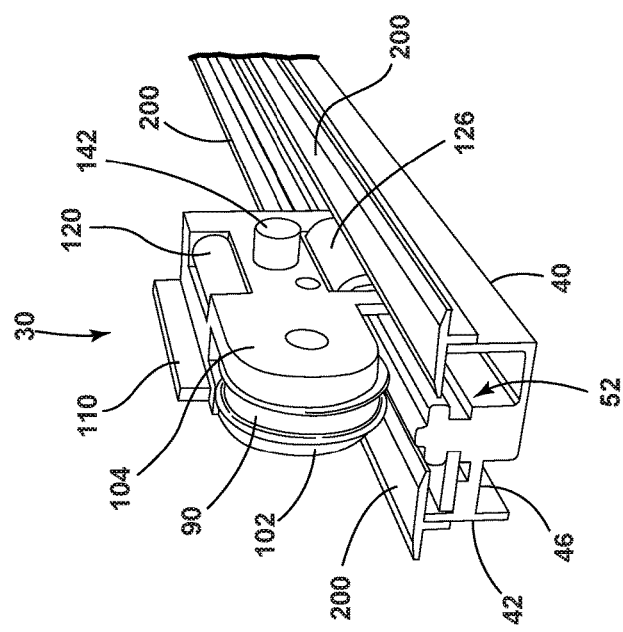

In embodiments, in a second range of cam positions (e.g., in which lock plate 110 is in an unlocked position), second anchor pin 124 may slide (e.g., generally in the transverse direction T) into and/or be disposed at least partially within second anchor recess 152 of cam 142, which may permit anchor 120 to rotate. In embodiments, rotation of anchor 120 (e.g., outward toward first side wall 42 of track 40) may permit anchoring section 126 to unclamp/disengage from ledge 52 and/or to move out of vertical alignment with ledge 52 (see, e.g., FIGS. 8A and 8B). In embodiments, a spring 130 may be connected to anchor 120 and/or housing and may be configured to bias anchor 120 and/or second pin 124 toward cam 142. For example, and without limitation, if cam 142 is rotated into the second range of positions, spring 130 may apply a force to anchor 120 toward cam 142, which may cause anchor 120 to rotate about axis 128, cause second pin 124 to enter second anchor recess 152, and/or cause anchoring section 126 to disengage from ledge 52. In embodiments, spring 130 may include one or more of a variety of biasing elements.

In embodiments, lock plate 110 and/or anchor 120 may be at least partially disposed in internal space 78. In embodiments, rotation of cam 142 may actuate one or both of lock plate 110 and anchor 120. For example, and without limitation, if cam 142 is rotated into the second range of positions, cam 142 may engage lock plate pin 112 to raise lock plate 110, and/or second anchor pin 124 may be permitted to slide into second anchor recess 152 to allow anchor 120 to rotate and disengage from ledge 52. In embodiments, if anchor 120 is disengaged from ledge 52, seat 20 and/or support 70 may be disconnected (e.g., completely removed and/or separated) from track 40 (see, e.g., FIG. 8B), which may permit, for example, seat 20 to be removed from a vehicle. In embodiments, a first amount of rotation of cam 142 may disengage lock plate 110 from lock profile 60 and/or unclamp anchoring portion 126 from ledge 52, which may permit longitudinal adjustment of seat 20. In embodiments, a second amount of rotation of cam 142 may completely disengage anchor 120 from ledge 52 such that anchoring portion is not vertically aligned with ledge 52, which may permit seat 20 to be disconnected (e.g., completely) from track 40. In embodiments, the first amount of rotation may be less than the second amount of rotation.

In embodiments, a first step of actuation may include disengaging lock plate 110 from lock profile 60 and unclamping/disconnecting anchor 120 from ledge 52, which may include anchoring section 126 remaining at least partially disposed vertically below (e.g., vertically aligned with) ledge 52 such that vertical movement of support 70 may be limited. Upon completion of the first step of actuation, support 70 may be moved along track 40 (e.g., horizontally) and/or vertical movement of support 70 may be limited. In embodiments, a second step of actuating may include further actuation of anchor 120 such that anchoring section 126 is not disposed below and/or vertically aligned with ledge 52, which may permit unrestricted vertical movement of support 70. In embodiments, seat 20 may be reconnected to track 40 and/or may be connected to one or more other tracks (e.g., tracks 40', 40'', 40''', 40''''). In embodiments, seat 20 may be connected to one or more tracks at a plurality of locations along tracks (see, e.g., FIG. 2).

In embodiments, cam 142 may be actuated in one or more of a variety of ways. In embodiments, a handle 160 may be connected directly to cam 142 and a user may rotate cam 142 directly via handle 160. In embodiments, cam 142 may include a cam flange 162 and/or a cam flange actuator 164 that may be configured to connect a connecting member 170A to cam 142. Cam flange actuator 164 may be connected to and/or fixed to rotate with cam 142. Cam flange actuator 164 may include, for example, a generally semi-circular shape and, in embodiments, may include a channel 162A (e.g., a circumferential channel) that may be configured to at least partially receive connecting member 170A. In embodiments, a connecting member (e.g., connecting member 170A) may include one or more of a variety of shapes, sizes, configurations, and/or materials. For example, and without limitation, connecting member 170A may include a lever, a rod, and/or a cable. In embodiments, connecting member 170A may be connected to a cross member 180, such as via a cross member flange 182. In embodiments, handle 160 may be connected and/or fixed to cross member 180 such that actuation and/or rotation of handle 160 may cause cross member 180 to rotate, which may apply a force (e.g., via cross member flange 182) to connecting member 170A, and connecting member 170A may apply a corresponding force to cam 142 (e.g., via cam flange 162), which may cause cam 142 to rotate.

In embodiments, a spring 190 may be connected to cam 142 and/or housing 72, and spring 190 may be configured to bias cam 142 into the first range of cam positions (e.g., such that lock plate 110 and/or anchor 120 may remain engaged with track 40). In embodiments, cam flange actuator 164 may be connected to cam 142 and/or cam flange 162, and may be configured to rotate relative to (e.g., independently of) cam 142 and/or cam flange 162, at least to some degree. In embodiments, cam flange actuator 164 may be configured such that initial actuation of handle 160 may cause cam flange actuator 164 to rotate without cam 142 and/or cam flange 162, and further actuation of handle 160 may cause cam flange actuator 164 to engage and/or rotate cam flange 162. Initial actuation including cam flange actuator 164 moving without cam 142 and/or cam flange 162 may permit a user to more easily actuate handle 160. In embodiments, a spring 192 may connected to cam flange 162 and/or cam flange actuator 164. Spring 192 may be configured to bias cam flange actuator 164 away from cam flange 162 and/or may be configured to keep connecting member 170A under tension. In embodiments, spring 190 and/or spring 192 may include one or more of a variety of biasing elements and/or other suitable element for providing a biasing function.

Figure 3:
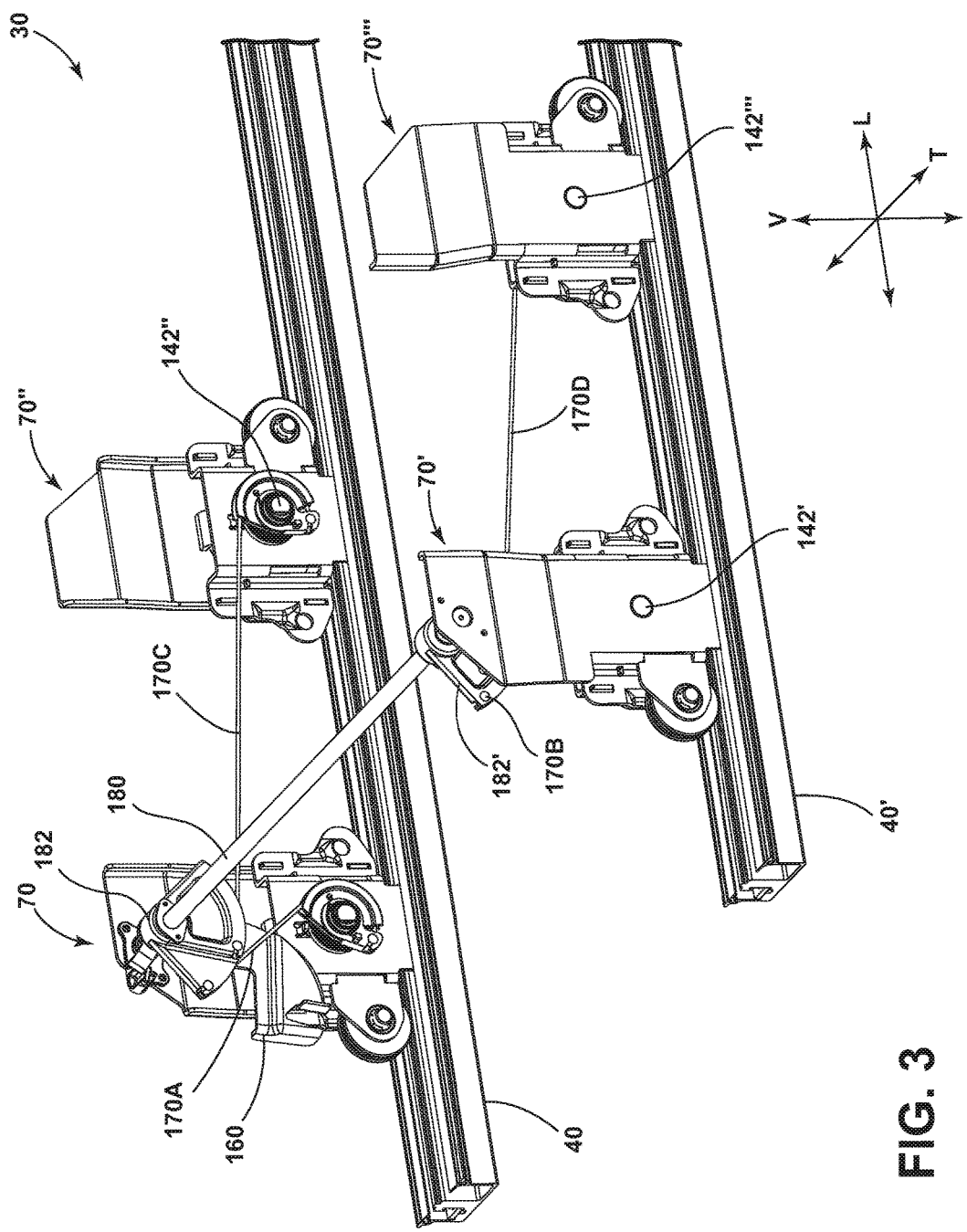
FIG. 3 is a perspective view generally illustrating portions of a track assembly in accordance with embodiments of the present disclosure.
Figure 4D:
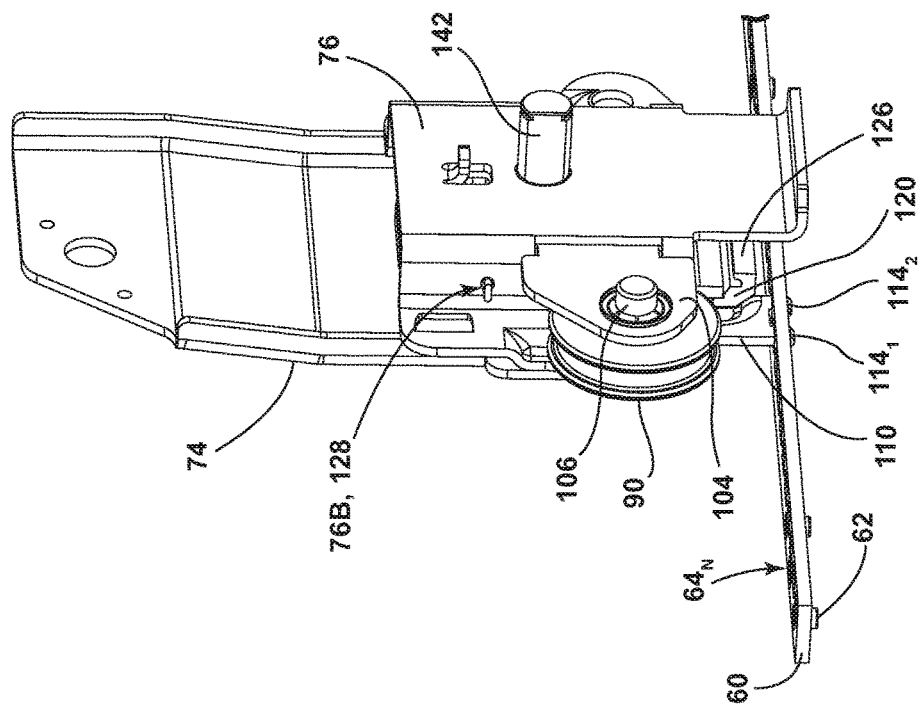
FIGS. 4C and 4D are perspective views generally illustrating portions of track assemblies in accordance with embodiments of the present disclosure.
Figure 4C:
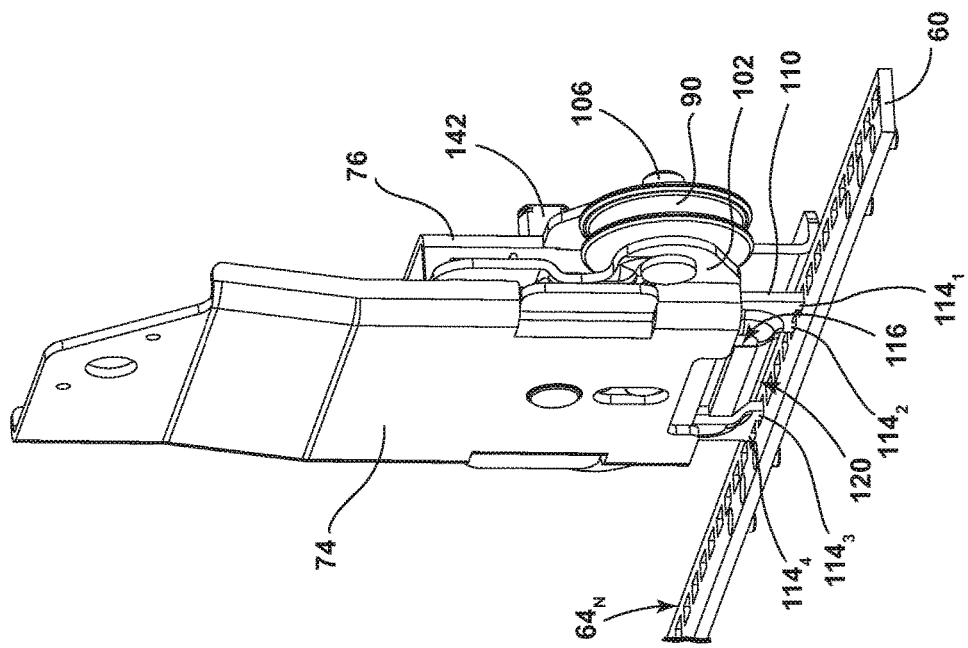
Figure 4E:
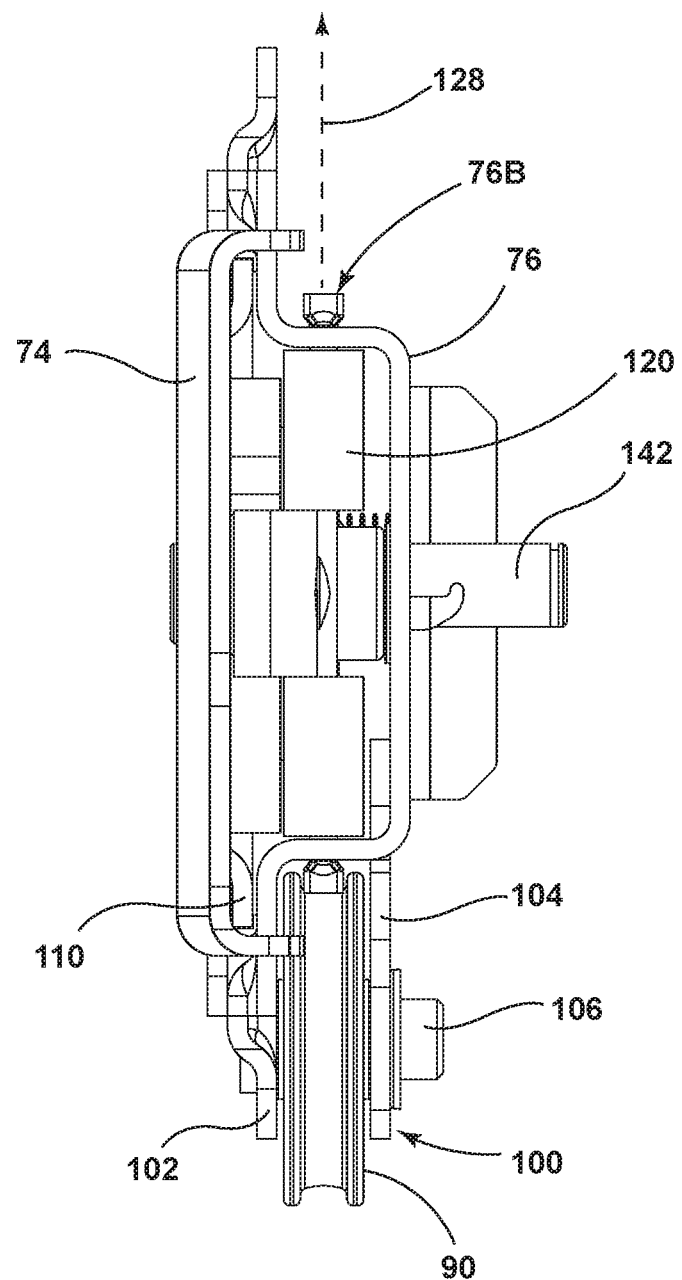
FIG. 4E is a top view generally illustrating portions of a track assembly in accordance with embodiments of the present disclosure.

In embodiments, a plurality of seat supports (e.g., seat supports 70, 70', 70'', 70''') may be connected to one or more tracks (e.g., tracks 40, 40') and two or more of the seat supports may be connected to rotate together (see, e.g., FIG. 3). For example, and without limitation, a second seat support 70' may be connected to a second track 40', and a cam 142' of second seat support 70' may be connected to cross member 180 and/or a second cross member flange 182' via a second connecting member 170B such that actuation of handle 160 may cause rotation of cam 142'. In embodiments, a third seat support 70'' may be connected to track 40 and/or a fourth seat support 70''' may be connected to second track 40'. In embodiments, a third connecting member 170C may connect a cam 142'' of third seat support 70'' to cross member flange 182 and/or a fourth connecting member 170D may connect a cam 142''' of fourth seat support 70''' to second cross member flange 182' such that actuation of handle 160 may cause simultaneous rotation of cams 142, 142', 142'', 142'''. In embodiments, actuation of a cam 142 may permit a seat support 70 to be moved along a track 40, removed from a track 40, connected to a different track (e.g., track 40') , and/or moved along the different track.

In embodiments, such as generally illustrated in FIGS. 10, 11, 12A, 12B, 13A, and 13B, track assembly 30 may include one or more covers 200 (e.g., rubber covers) that may be configured to cover portions of track 40, such as for example, gaps between first side wall 42 and middle wall 48, and/or between middle wall 48 and second side wall 44.

In embodiments, middle wall ledge 52 of track may be disposed such that horizontal portion 54 may extend laterally outward toward second side wall 44. In such embodiments, track assembly 30 may be configured in generally the same manner as embodiments in which horizontal portion 54 extends laterally outward toward first side wall 42. In such embodiments, housing 72 may support anchor 120 such that anchor 120 may rotate outward toward second side wall 44 upon rotation of cam 142 instead of outward toward first side wall 42.

In embodiments, in the event of one or more large forces being applied to track assembly 30 (e.g., in a vehicle crash), the forces may be distributed, evenly or unevenly, between anchor 120 and lock plate 110.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. It should also be understood that references to a spring are not limited to a particular type of spring and may include, without limitation, any type of biasing member and/or material. It should be understood that while embodiments of the present disclosure have been described in connection with vehicle seats, track assembly 30 may be applied to other applications and is not limited to seating applications. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A track assembly comprising:
   a track; and
   a support configured for selective connection with and movement along the track, the support including:
   a lock plate configured to selectively engage a lock profile of the track; and
   a cam connected to the support to rotate about an axis extending in a transverse direction;
   an anchor configured to selectively engage a ledge of the track;
   wherein, in a locked position of the lock plate, the lock plate is configured to restrict rotation of the anchor out of a locked position of the anchor; the lock plate includes a pin and the cam includes a recess configured to receive the pin; the pin extends in a transverse direction; a first side of the cam includes the recess; a second side of the cam includes an anchor recess; and the anchor recess is configured to receive a pin of the anchor.

2. The track assembly of claim 1, wherein the cam is configured to selectively engage and disengage the lock plate and the anchor from the track.

3. The track assembly of claim 2, wherein the second side of the cam is disposed opposite the first side of the cam; and the second side further includes a second anchor recess.

4. The track assembly of claim 1, wherein the lock plate includes a recess, and, in an unlocked position of the lock plate, the anchor is configured to rotate into the recess.

5. The track assembly of claim 1, further comprising a second track and a second support configured for selective connection with the second track, wherein the second support includes a second lock plate and a second anchor.

6. The track assembly of claim 5, further comprising a cross member connected to the support and the second support.

7. The track assembly of claim 6, wherein the second support includes a second cam, a first connecting member is connected to the cam and the cross member, and a second connecting member is connected to the second cam and the cross member.

8. The track assembly of claim 7, further comprising a third support configured for selective connection with the track and a fourth support configured for selective connection with the second track, wherein the third support includes a third lock plate, a third anchor, and a third cam, and the fourth support includes a fourth lock plate, a fourth anchor, and a fourth cam.

9. The track assembly of claim 8, further comprising a third connecting member and a fourth connecting member, wherein the third connecting member is connected to the third cam and the cross member, and the fourth connecting member is connected to the fourth cam and the cross member.

10. The track assembly of claim 9, wherein rotation of the cross member causes simultaneous rotation of the cam, the second cam, the third cam, and the fourth cam.

11. The track assembly of claim 1, wherein an initial movement of the lock plate disengages the lock plate from the lock profile; and the initial movement of the lock plate disengages the anchor from the ledge.

12. The track assembly of claim 11, wherein further movement of the lock plate causes rotation of the anchor.

13. The track assembly of claim 1, wherein the second side of the cam includes a second anchor recess, and the second anchor recess is configured to receive a second pin of the anchor.

14. The track assembly of claim 13, wherein the anchor recess includes a first section and a second section, the first section includes a first radius, the second section includes a second radius, and the second radius is smaller than the first radius.

15. The track assembly of claim 14, wherein the anchor is configured to move downward as the cam rotates and the pin of the anchor moves from the first section to the second section.

16. The track assembly of claim 1, wherein the anchor is supported on the support for vertical translation and for rotation about an axis extending in a longitudinal direction; and the lock plate is configured to selectively engage the lock profile of the track from a vertical direction.

17. The track assembly of claim 1, further comprising a wheel connected to the support and configured for rolling along a ridge disposed at a top of the track.

* * * * *